D. C. DAVIS.
COOLING SYSTEM.
APPLICATION FILED APR. 25, 1914.

1,259,371.

Patented Mar. 12, 1918.

WITNESSES:
Geo. W. Hansen.
R. J. Fitzgerald.

INVENTOR
David C. Davis
BY
Wesley Carr
ATTORNEY

UNITED STATES PATENT OFFICE.

DAVID C. DAVIS, OF SWISSVALE, PENNSYLVANIA, ASSIGNOR TO WESTINGHOUSE ELECTRIC AND MANUFACTURING COMPANY, A CORPORATION OF PENNSYLVANIA.

COOLING SYSTEM.

1,259,371. Specification of Letters Patent. Patented Mar. 12, 1918.

Application filed April 25, 1914. Serial No. 834,543.

*To all whom it may concern:*

Be it known that I, DAVID C. DAVIS, a citizen of the United States, and a resident of Swissvale, in the county of Allegheny and State of Pennsylvania, have invented a new and useful Improvement in Cooling Systems, of which the following is a specification.

My invention relates to cooling systems, and it has particular reference to current-transforming and rectifying systems wherein it is necessary to artificially cool the transformers or the current rectifiers.

The object of my invention is to provide novel and effective means for so controlling the cooling action in transformers and rectifiers that the voltage or current to a load supplied thereby will be maintained substantially constant, irrespective of the amount of such load and irrespective of the initial temperature of the cooling fluid.

Figure 1:
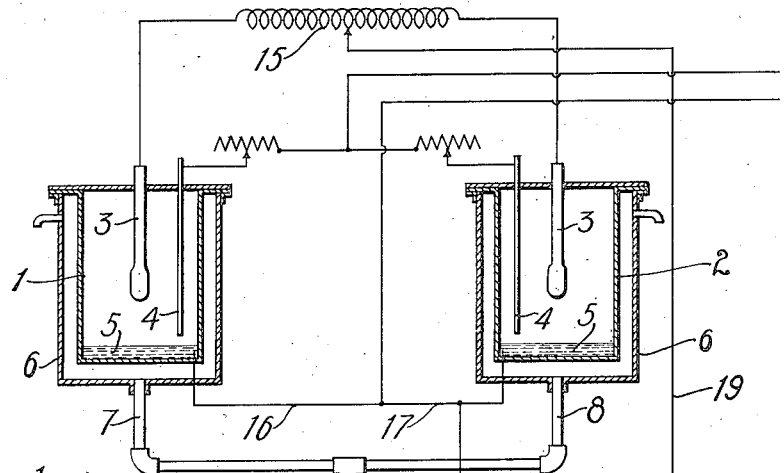
Figure 2:
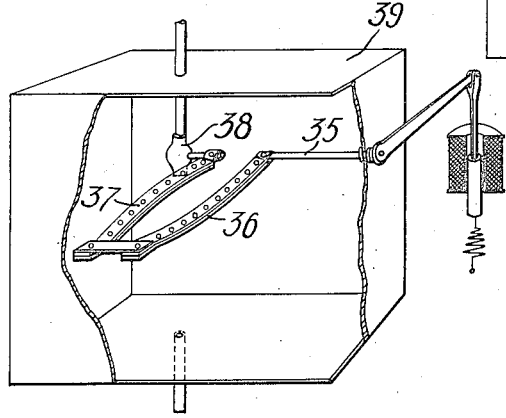
Figure 3:
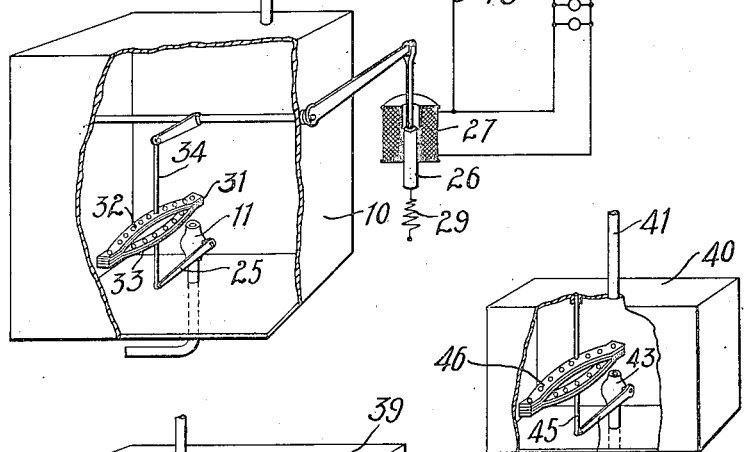

In the accompanying drawing, Figure 1 is a diagrammatic view of a system embodying my invention, with the thermostatic control device thereof shown in perspective and partially broken away. Fig. 2 is a broken perspective view of a modification of the thermostatic control device, and Fig. 3 is a broken perspective view of a form of thermostatic control device adapted to be employed with cooling systems in general.

In the operation of artificially cooled transformers, rectifiers, or other pieces of apparatus of similar nature, it is frequently desirable to maintain a substantially constant cooling effect, that is to say, there should be removed from the device to be cooled approximately an equal number of effective calories per unit of time. By effective calories, I mean the volume of cooling fluid supplied to the device per unit of time multiplied by the difference in temperature between the cooling fluid and the device to be cooled. In consequence, it is necessary to supply a much larger volume of cooling fluid in summer when the initial temperature is comparatively high than in winter when the initial temperature is comparatively low. I accomplish this result automatically by means of my invention.

The rectification of alternating currents by means of a vapor rectifier is attended by a drop in potential within the rectifier, and I have discovered that the amount of this drop is dependent upon the temperature at which the rectifier cathode is maintained. The drop in potential increases as the temperature is lowered, and it may be stated, in a general way, that the amount of potential drop varies inversely with the cathode temperature. It is customary, when a metal case rectifier is employed, to supply water or other cooling fluid to the casing, and the amount of potential drop across the rectifier may be regulated by varying the temperature, or the amount, of the cooling medium so supplied. For example, I have found that, in a rectifier delivering a direct current of 200 amperes, the voltage drop, when the cooling water is supplied at 37° C., is 20 volts, while, when the cooling water is supplied at 56° C., the drop is only 12 volts. The temperature of the anode is the same under both conditions, though other tests have shown that the drop is not affected by changes in the temperature of the anode, if the cathode temperature remains constant.

I have taken advantage of this variation in voltage drop with variation in the cathode temperature to obtain regulation of the direct-current voltage, current and power when the alternating current is supplied at a constant voltage.

Referring now to Fig. 1 of the drawing, two single-unit rectifier tanks 1 and 2 are shown, each containing a main anode 3, auxiliary maintaining or keep-alive anode 4, and a vaporizable cathode 5. Each tank is surrounded by a second tank or jacket 6, spaced therefrom, means being provided for introducing a cooling fluid, such, for example, as water, into the space between the tanks. As shown in the drawing, the fluid-supplying means comprises pipes 7 and 8 leading respectively to the jackets surrounding the rectifiers 1 and 2, and a supply pipe 9 leading from a tank 10, admission to which is controlled by a valve 11.

Alternating current is supplied to the rectifier units from any convenient source 15, which may be the secondary winding of a transformer, and the direct current from the rectifiers is delivered by conductors 16, 17 and 18 to an external work circuit that is connected, by a conductor 19, to the middle point of the transformer winding 15.

The valve 11 is opened and closed by a lever 25 which is operatively connected to the movable core 26 of a coil 27. A spring 29 is attached to the solenoid core 26 and tends to hold the core in such position that the valve 11 will be closed. The direct-current circuit may include any suitable translating devices, such, for example, as a series of incandescent lamps 30, constituting a variable direct-current load. The solenoid 27 is connected in shunt around this load.

The direct current delivered by the rectifiers will energize the solenoid 27 to draw its core 26 upwardly to a greater or less extent, according to the amount of current supplied to the solenoid. This movement of the core 26 will effect the opening of the valve 11 to a corresponding degree. Water will therefore be supplied to the rectifier jackets in greater amounts, as the current in the solenoid 27 increases and in less amounts as this current decreases. The variation in the water supply and the consequent alteration in the cathode temperature will cause a corresponding variation in the voltage drop across the rectifier. The shunt connection of the solenoid 27, shown in Fig. 1, is especially desirable for work where constant potential is to be maintained in the direct-current circuit. The subject matter to this point is not of my invention but is disclosed and claimed in copending application Serial No. 819,691, filed Feb. 19, 1914, by William Tschudy and Sidney W. Farnsworth and assigned to Westinghouse Electric & Manufacturing Company.

The system shown in Fig. 1 will effect automatic adjustment of the electrical condition of the direct-current circuit in the manner described above, provided the cooling medium supplied to the cathode is always of the same temperature. However, when water is used as a cooling medium, its temperature varies with the season of the year or with a change in the weather at any season. It will therefore be desirable to provide means for compensating for these changes in the temperature of the water. For this purpose I insert a thermostatic device 31 in the connection between the solenoid core 26 and the valve 11. The device 31 comprises two bimetallic members 32 and 33 that are concave toward each other and are firmly united at their ends by any suitable means, such, for example, as rivets. The two strips of metal comprised in each of the bimetallic members 32 and 33 are of different coefficients of expansion and are firmly riveted together throughout their entire lengths. As is well known, a bimetallic strip of the character described will decrease its radius of curvature with an increase in temperature and vice versa. Accordingly, assuming that a movement of the core 26 into the solenoid 27 will open the valve 11, as would be necessary to give proper voltage regulation on a constant-potential circuit, an increase in the initial temperature of the cooling fluid will increase the curvature of the members 32 and 33, increasing the effective length of the rod 34 and allowing a greater volume of the cooling fluid to flow than would otherwise be the case.

Fig. 2 shows a modification of the bimetallic thermostatic element wherein the shaft 35 connected to the solenoid is rigidly attached to a thermostatic element 36 which is concave upwardly. A second thermostatic element that is concave downwardly is rigidly attached to the thermostatic element 36 at its outer end and to the stem of a valve 38 at is inner end. The valve 38 controls the flow of cooling fluid from the inclosing case 39. Assuming a rise in the initial temperature of the cooling fluid, both the thermostatic elements will increase their curvature, and the outer ends thereof will act against each other to force the valve stem around in a clockwise direction relative to the shaft 35 and thus increase the flow of cooling fluid.

Referring to the form of device shown in Fig. 3, a casing 40 is inserted in the cooling-fluid supply pipe 41 which is supplying cooling fluid to a transformer or similar apparatus, by means of a tube 42. The rate of flow from the casing 40 to the tube 42 is controlled by a valve 43. An arm 44 is connected to the stem of the valve 43 and to the wall of the casing by a rod 45 in which is inserted a thermostatic device 46. The valve is so adjusted that, upon an increase in the temperature of the cooling fluid, the supply thereof will be automatically increased and vice versa, thus maintaining a constant cooling effect in the device the temperature of which is being controlled.

My system is capable of many variations within the scope of my invention. For example, it may include either single-anode or multiple-anode rectifiers, and the rectifiers may be supplied with either single-phase or polyphase alternating currents, or it may include single-phase or polyphase transformers or any other type of apparatus, electrical or non-electrical, in which it is desired to control the temperature. Furthermore, means other than a solenoid may be employed to actuate the valve in accordance with the electrical condition of the apparatus to be controlled, and the actuating means may respond to voltage changes, to current changes or to power changes.

My thermostatic element may be radically modified without departing from the spirit of my invention, which is sufficiently broad in scope to embrace any and all means for varying the supply of a cooling fluid in response to temperature changes therein.

Having thus described my invention, what I claim is:

1. The combination with a heat-generating device, of fluid-cooling means therefor, means for varying the supply of cooling fluid in accordance with the amount of heat generated in said device, and means for compensating for changes in the temperature of the fluid supply.

2. The combination with a heat-generating device, of cooling means therefor, a supply of cooling fluid of variable temperature for said cooling means, and means for increasing the supply of said cooling fluid upon an increase in the temperature thereof and for decreasing the supply of said cooling fluid upon a decrease in the temperature thereof.

3. The combination with a device generating variable amounts of heat, of cooling means therefor, a supply of cooling fluid of variable temperature for said cooling means, means for varying the supply of cooling fluid in accordance with the amount of heat to be dissipated and also in accordance with the initial temperature of the cooling fluid.

4. The combination with a vapor rectifier, of means for regulating the voltage to the load thereof, comprising a cooling jacket therefor, means for varying the supply of cooling fluid to said jacket in accordance with the heat generated at the cathode, and means for also varying the supply of the cooling fluid in accordance with the initial temperature thereof.

5. The combination with the cooling system of a vapor rectifier, of means for compensating for changes in the heat to be dissipated and for changes in the initial temperature of the cooling fluid.

6. The combination with a vapor rectifier, of a cooling jacket therefor, a fluid supply for said jacket, a valve regulating said fluid supply and controlled by the voltage of the rectifier, and a thermostat immersed in the cooling fluid and arranged to alter the connection between said valve and its controlling means.

In testimony whereof, I have hereunto subscribed my name this 23rd day of April, 1914.

DAVID C. DAVIS.

Witnesses:
  GEO. W. HANSEN,
  B. B. HINES.